US009160839B2

(12) United States Patent
Bocking et al.

(10) Patent No.: US 9,160,839 B2
(45) Date of Patent: *Oct. 13, 2015

(54) HANDHELD ELECTRONIC DEVICE INCLUDING CROSS APPLICATION USE OF PHONE RELATED INPUTS, AND ASSOCIATED METHOD

(75) Inventors: Andrew D. Bocking, Waterloo (CA); Raymond P. Vander Veen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,106

(22) Filed: Nov. 18, 2011

(65) Prior Publication Data

US 2012/0064876 A1 Mar. 15, 2012

Related U.S. Application Data

(63) Continuation of application No. 10/939,622, filed on Sep. 13, 2004, now Pat. No. 8,086,274.

(51) Int. Cl.
*H04B 1/38* (2015.01)
*H04M 1/725* (2006.01)
*H04M 1/2745* (2006.01)

(52) U.S. Cl.
CPC .......... *H04M 1/7258* (2013.01); *H04M 1/2745* (2013.01); *H04M 1/72547* (2013.01)

(58) Field of Classification Search
USPC ........... 455/566, 418, 412.1, 413, 414.1, 415, 455/466, 411, 412.2, 417, 403, 445, 555, 455/560, 422, 553.1, 90.1, 556.2, 575, 550, 455/66, 556.1, 457, 552.1, 90.2, 90.3, 303; 707/6, 3, 104.1, 513; 709/217, 204, 709/206; 345/173, 179, 156, 174, 180, 175, 345/176, 177, 178, 158, 157, 168, 169, 810, 345/32; 178/18, 19; 379/96, 368, 93.17, 379/93.24, 67.1, 88.13, 100.01, 100.08, 379/142.06, 201.01, 88.12, 88.11, 88.21, 379/88.22, 93.08, 114.2, 93.1, 93.05, 93.2, 379/142, 127, 196; 341/22, 33, 34; 359/803
See application file for complete search history.

(56) References Cited

U.S. PATENT DOCUMENTS 5,708,804 A   1/1998   Goodwin et al.
5,815,142 A   9/1998   Allard et al.
(Continued)

FOREIGN PATENT DOCUMENTS

EP           1104151 A2    5/2001

OTHER PUBLICATIONS

Office Action issued on Apr. 20, 2012, in Indian Patent Application No. 2415/DEL/2005, filed Sep. 8, 2005.
(Continued)

*Primary Examiner* — Charles Appiah
*Assistant Examiner* — Alexander Yi
(74) *Attorney, Agent, or Firm* — Jeffrey N. Giunta; Fleit Gibbons Gutman Bongini & Bianco P.L.

(57) ABSTRACT

An improved handheld electronic device and an associated method provide added convenience for the user by enabling the user to quickly and easily initiate telephone related functions from applications other than the device's phone and address book applications using a dedicated phone related key. The device includes a plurality of use states and each one of the use states has an associated function that is to be initiated upon depression of the phone related key. When the phone related key is depressed, the current use state is determined and the function that is associated with the current use state is executed.

20 Claims, 5 Drawing Sheets

(56) References Cited

U.S. PATENT DOCUMENTS

| | | | |
|---|---|---|---|
| 5,873,099 A * | 2/1999 | Hogan et al. | 707/999.202 |
| 6,766,017 B1 * | 7/2004 | Yang | 379/355.02 |
| 6,771,980 B2 | 8/2004 | Moon | |
| 6,781,575 B1 | 8/2004 | Hawkins et al. | |
| 6,980,641 B1 * | 12/2005 | Stanford et al. | 379/354 |
| 7,167,728 B1 * | 1/2007 | Wagner et al. | 455/566 |
| 7,221,748 B1 * | 5/2007 | Moore et al. | 379/142.15 |
| 2002/0065820 A1 * | 5/2002 | Enns | 707/6 |
| 2002/0128036 A1 * | 9/2002 | Yach et al. | 455/552 |
| 2005/0050032 A1 * | 3/2005 | Lee | 707/3 |
| 2005/0266839 A1 * | 12/2005 | Paul et al. | 455/418 |

OTHER PUBLICATIONS

Information and Communication Mobile, "Siemens", XP-002310504, pp. 1-62.
Sony, "Mobile Telephone User Guide", XP-002310503, pp. 1-81.
Siemens AG 2002, User's Manual for Model S55 Mobile Phone.

* cited by examiner

HANDHELD ELECTRONIC DEVICE INCLUDING CROSS APPLICATION USE OF PHONE RELATED INPUTS, AND ASSOCIATED METHOD

This invention is a continuation of U.S. patent application Ser. No. 10/939,622, filed Sep. 13, 2004, entitled "HANDHELD ELECTRONIC DEVICE INCLUDING CROSS APPLICATION USE OF PHONE RELATED INPUTS, AND ASSOCIATED METHOD", which is herein incorporated by reference.

BACKGROUND OF THE INVENTION

1. Field of the Invention

The invention relates generally to handheld electronic devices and, more particularly, to a handheld electronic device that utilizes phone related inputs, for example from <SEND> and <END> keys, across multiple applications executed by the device. The invention also relates to a method of utilizing phone related inputs across multiple applications executed by the device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among these applications.

Many devices that provide telephone functionality include dedicated <SEND> and <END> keys, or the like, for enabling a user to initiate a new call, answer an incoming call, or terminate a call that is in progress. The <SEND> key, however, is typically only able to initiate a call after the user has either: (i) entered or initiated the device's telephone application and entered a phone number or selected a stored phone number (such as in a call log), or (ii) entered or initiated the device's address book application and selected a stored phone number. In such a device, the <SEND> and <END> keys are not able to be used from other active applications to initiate telephone related activity. However, with more and more handheld electronic devices including multiple applications, it would be convenient and useful for a user to be able to quickly and easily initiate telephone related activity from applications other than the telephone and address book applications, particularly those applications that may include contact related information for an individual that the user desires to call. For example, a user may receive an email, SMS message or MMS message from an individual and may, while viewing the email, SMS message or MMS message in the associated application, desire place a call to that individual. With known handheld electronic devices, the individual would need to leave the current application (e.g., email, SMS or MMS), activate the telephone application, either enter that individual's phone number or access that individual's phone number from the address book application, and activate or depress the <SEND> key. These steps, while ultimately achieving the purpose of placing the desired call, are inconvenient and time consuming. Thus, there is a need for a handheld electronic device that will enable a user to utilize phone related inputs, such as the activation (e.g., depression) of the <SEND> key, to execute phone related functions while another application is active and in use.

SUMMARY OF THE INVENTION

An improved multi-application handheld electronic device and an associated method provide added convenience for the user by enabling the user to quickly and easily initiate telephone related functions, such as placing a phone call, directly from applications other than the device's phone and address book applications using a dedicated phone related key. A user, when using an application other than the phone or address book application, no longer needs to exit or navigate out of the current application and activate the phone or address book application to initiate telephone functionality, as was the case in the known prior art.

These and other aspects of the invention are provided by a method of using a dedicated phone related key of a handheld electronic device, such as a <SEND> or <END> key, to initiate and execute phone related functions. The handheld electronic device includes a plurality of applications including a phone application, an address book application, and one or more other applications. The device also includes a plurality of use states that are based on the application or portion thereof that is currently active and the information, if any, that is selected by the user. Each one of the plurality of use states has an associated function that is to be initiated upon depression of the phone related key.

The method of the invention includes detecting that the phone related key has been depressed by a user, and then determining the current use state of the handheld electronic device. The current use state is one of the plurality of use states that has an associated function as described above. Also, one of the other applications (other than the phone and address book applications) is the currently active application in the current use state. The method, after determining the current use state, further includes making the phone application active and initiating and executing the function that is associated with the current use state.

According to one aspect of the invention, a portion of information comprising contact related information is selected by the user in the current use state, and the associated function comprises placing a phone call based on the selected portion of information. The contact information may include a phone number, wherein the phone call will be placed to the phone number. Alternatively, the contact related information, such as a person's name or an email address, may be used to search the entries stored by the address book application to find an associated phone number. Once found, the phone call is placed to the phone number. The other applications of the handheld electronic device may include one or more of a messaging application, such as an email, SMS or MMS application, a browser application, a memo application, a calendar application, and a task application.

According to another aspect of the invention, in the current use state the user is connected to an active phone call. When the phone related key, such as a <SEND> key, is depressed, the handheld electronic device activates a conference call routine for conferencing another call in to the current call.

According to another aspect of the invention, an improved handheld electronic device is provided that includes an input apparatus including a dedicated phone related key such as a <SEND> or <END> key, a processor, and a memory. The memory stores a phone application, an address book application, and one or more other applications executable by the processor. The memory also stores use state information inducing a plurality of use states of the handheld electronic device and a phone related function associated with each use state that is to be initiated upon depression of the phone related key. The memory further stores one or more routines executable by the processor that include instructions for implementing the various embodiments of the method for using a dedicated phone key to initiate and execute phone related functions across applications as described above.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
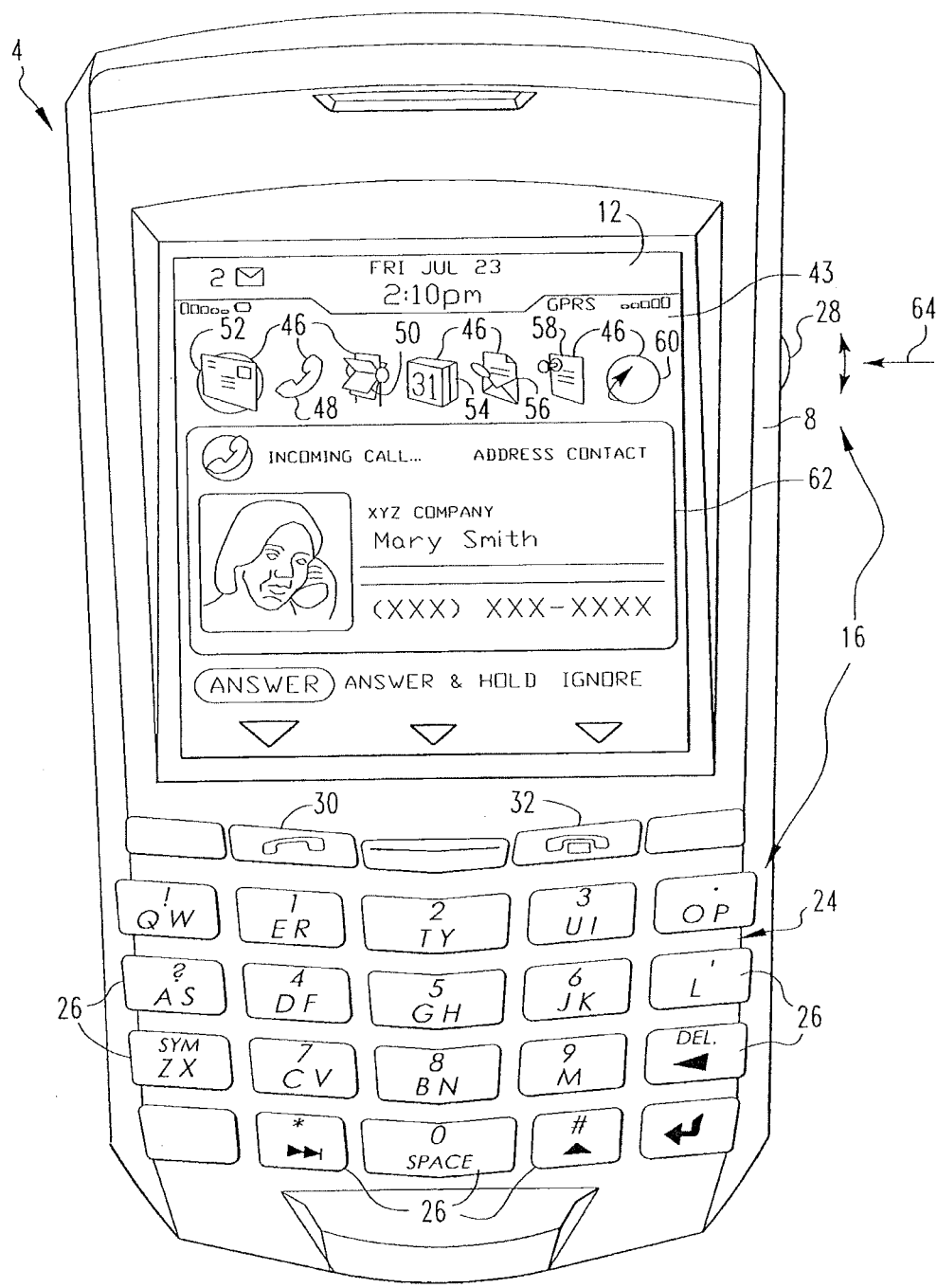
FIG. 1 is a top plan view of an improved handheld electronic device in accordance with the invention.
Figure 2:
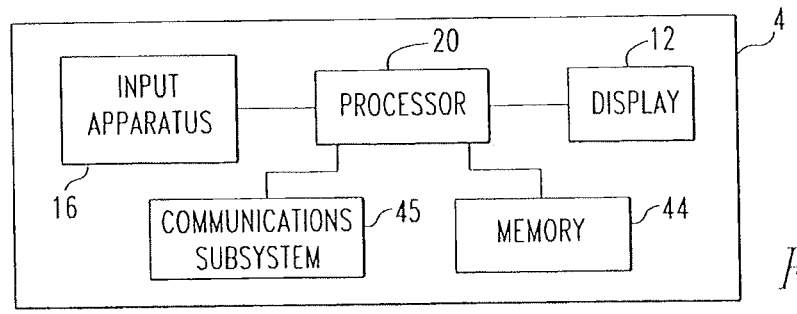
FIG. 2 is a block diagram of the handheld electronic device of FIG. 1.

An improved handheld electronic device 4 in accordance with the invention is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. While for clarity of disclosure reference has been made herein to the exemplary display 12 for displaying various types of information, it will be appreciated that such information may be stored, printed on hard copy, be computer modified, or be combined with other data, and all such processing shall be deemed to fall within the terms "display" or "displaying" as employed herein. Examples of handheld electronic devices are included in U.S. Pat. Nos. 6,452,588 and 6,489,950, which are incorporated by reference herein. The handheld electronic device 4 is of a type that includes a cellular telephone capability and, as will be described in greater detail below, allows for cross application use of phone related inputs to initiate phone functions. As used herein, the terms "phone" and "telephone" shall refer to any type of voice communication initiated and conducted over a wired and/or wireless network.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. Keys 26 include a <SEND> key 30 and an <END> key 32, the functions of which will be described in greater detail below. The keys 30, 32 may include suitable text and/or graphics (as shown) disposed (e.g., printed) thereon. As used herein, the expression "function" and variations thereof can refer to any type of process, task, procedure, routine, subroutine, function call, or other type of software or firmware operation that can be performed by the processor 20 of the handheld electronic device 4.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" herein shall include one or more routines, subroutines, function calls or the like, alone or in combination.

As is also shown in FIG. 2, processor 20 is in electronic communication with communications subsystem 45. Communications functions for handheld electronic device 4, including data and voice communications, are performed through communications subsystem 45. Communications subsystem 45 includes a transmitter and a receiver (possibly combined in a single transceiver component) and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobiltex™, Dat TAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4. Together, processor 20, memory 44 and communications subsystem 45 may, along with other components (having various types of functionality), be referred to as a processing unit.

In FIG. 1 the display 12 is depicted as displaying a home screen 43 that includes a number of applications depicted as discrete icons 46, including an icon representing a phone application 48, an address book application 50 for storing information for a plurality of contacts, a messaging application 52 which includes email, SMS and MMS applications, a calendar application 54, a memo application 56 for enabling a user to create documents and to record notes, lists and the like, a task application 58 for enabling a user to create and manage lists of tasks, and a browser application 60 for accessing and navigating the Internet. As is known in the art, address book application 50 allows the user of handheld electronic device 4 to store contact related information for a number of contacts, including, among other things, the contact's name, phone number, home and office addresses, email address, and other information that may be used to contact the person.

In FIG. 1, the home screen 43 is currently active and would constitute a portion of an application. In addition, display 12 shown in FIG. 1 shows a pop-up box 62 that indicates that there is currently a phone call coming into handheld electronic device 4. Pop-up box 62 provides certain information relating to the incoming call, including, for example, the caller's phone number and identifying information if the caller and phone number are stored as a contact by address book application 50 of handheld electronic device 4. Other applications, such as phone application 48, address book application 50, messaging application 52, calendar application 54, memo application 56, task application 58 or browser application 60, can be initiated from the home screen 43 by providing an input through the input apparatus 16, such as by rotating the thumbwheel 28 and providing a selection input by translating the thumbwheel 28 in the direction indicated by the arrow 64 in FIG. 1.

According to the invention, certain predetermined functions of handheld electronic device 4 are initiated when either <SEND> key 30 or <END> key 32 is pressed by a user depending on the current use state of handheld electronic device 4. As used herein, the term use state refers to the application and/or portion thereof that is currently active and in use on handheld electronic device 4 and the information, if any, that is selected or highlighted by the user using input apparatus 16. Table 1 below shows a number of use states of handheld electronic device 4 and the corresponding function that will be implemented by handheld electronic device 4 upon activation (e.g., depression) of <SEND> key 30 in each use state according to one embodiment of the invention. It will be appreciated that Table 1 is not meant to be exhaustive, and instead other use states and corresponding functions are possible without departing from the scope of the invention.

TABLE 1

| USE STATE | FUNCTION INITATED BY <SEND> KEY |
| --- | --- |
| 1. Idle, meaning a state or no user action for a period of time | Make phone application the currently active application; if <SEND> key is depressed again without any other actions, the last number dialed will immediately be called |
| 2. Phone number hyperlink selected in an application other than phone application, such as email, browser, SMS or MMS | Immediately call the selected phone number |
| 3. In the phone application with a "hot list" (list of most frequently called names/numbers) or call log item selected | Immediately call the phone number associated with the selected hot list or call log item |
| 4. In phone application with a number entered in "Enter Number" field | Immediately call the entered number |
| 5. In the address book application showing a list of contacts with a listed contact selected | Immediately call the phone number associated with the selected contact if only one phone number is stored for that contact; if more than one phone number is stored for that contact, provide a prompt to the user to select a phone number to call |
| 6. In the address book application with a specific contact's information open and displayed without a phone number field being selected | Immediately call the phone number associated with the opened contact if only one phone number is stored for that contact; if more than one phone number is stored for that contact, provide a prompt to the user to select a phone number to call |
| 7. In the email, SMS, or MMS application with contact related information such as a name or email address that appears in the header or body of an email, SMS message or MMS message selected, or in an application such as the calendar or task application with contact related information selected, and the selected information is also stored by the address book application in connection with a contact | Immediately call the phone number from the address book application that is associated with the selected name if only one phone number is stored in the address book application for the corresponding contact; if more than one phone number is stored for that contact, provide a prompt to the user to select a phone number to call |
| 8. In the address book application with a specific contact's information open and displayed and with a particular phone number field being selected | Immediately call the selected phone number |
| 9. In any application with a phone call incoming | Answer the incoming phone call |
| 10. In any application and connected to a phone call | Make the phone application the currently active application (if not so already), activate the conference call function, and await entry of a phone number to be conferenced in; after number is entered and <SEND> key is depressed again, the first call is placed on hold and the second phone number is dialed; the first phone number is conferenced in when the <SEND> key is depressed yet again |

Table 2 below shows a number of use states of handheld electronic device 4 and the corresponding function that will be implemented by handheld electronic device 4 upon depression of <END> key 32 in each state according to one embodiment of the invention. As was the case with Table 1, it will be appreciated that Table 2 is not meant to be exhaustive, and instead other use states and corresponding functions are possible without departing from the scope of the invention.

TABLE 2

| USE STATE | FUNCTION INITATE BY <END> KEY |
| --- | --- |
| 1. On a current active phone call in the the phone application ("active call" screen being displayed) | End the call and return the user to the state/application the device was in immediately prior to the call being made or received |
| 2. On a current, active phone call but an application other than the phone application is the currently active application | End the current call and (i) play an audible hang-up tone, and (ii) flash the active call screen momentarily with a "disconnected" message; return user to the state/application the device was in immediately before the <END> key was depressed |
| 3. Incoming phone call in any application | Ignore the incoming call |
| 4. Idle, meaning a state or no user action for a period of time | Return user to the home screen |

Figure 3A:
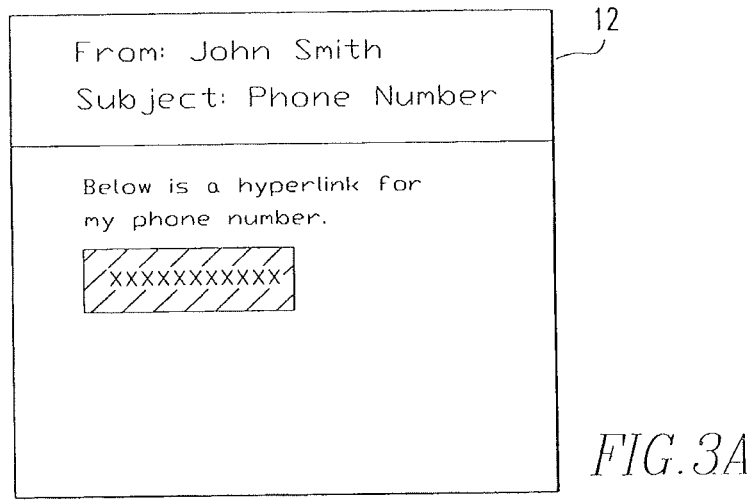
FIGS. 3A, 3B, 4A, 4B, 5A and 5B are exemplary views of a portion of the display of the handheld electronic device of FIGS. 1 and 2 according to the invention.
Figure 3B:
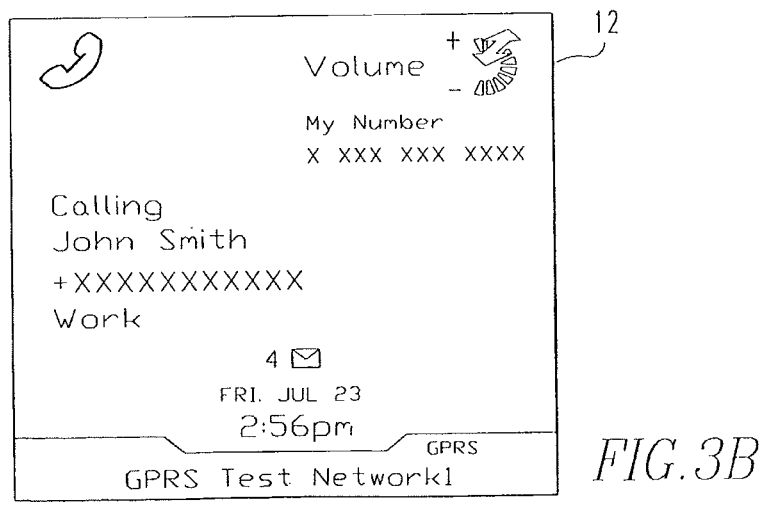
Figure 4A:
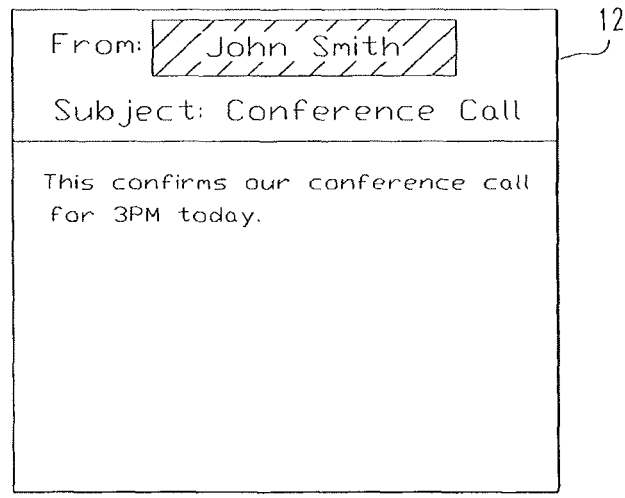
Figure 4B:
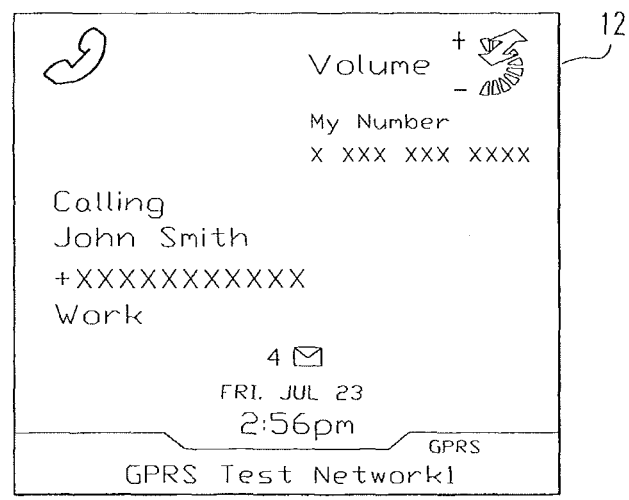
Figure 5A:
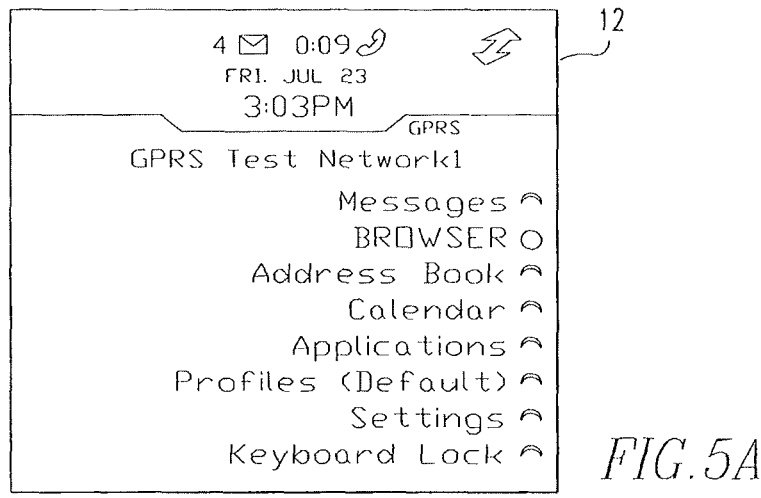
Figure 5B:
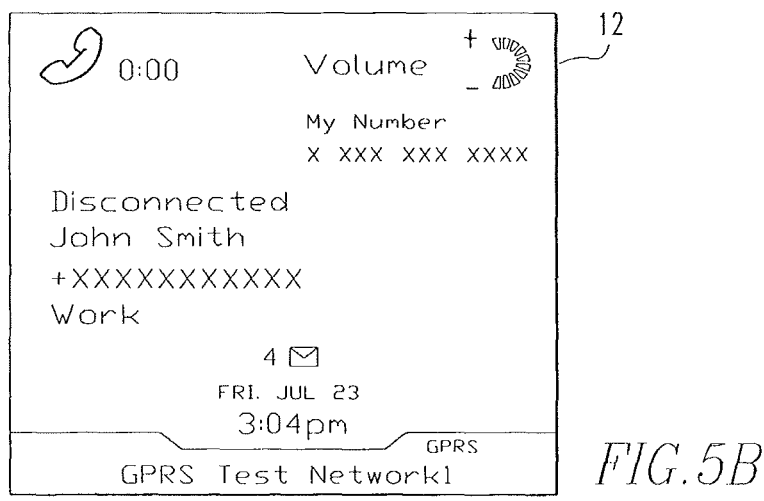

As seen in Tables 1 and 2, a number of use states and corresponding functions involve execution across two or more applications of handheld electronic device 4. For example, in use case number 2 of Table 1, handheld electronic device 4 begins in, for example, the email, browser, SMS or MMS application with a phone number hyperlink selected, and activates the phone application to place a call to the phone number of the hyperlink based simply on the depression of <SEND> key 30. FIGS. 3A and 3B are exemplary views of a portion of display 12 before and after <SEND> key 30 is depressed in use state number 2 of Table 1. Similarly, in use state number 7 of Table 1, handheld electronic device 4 begins in the email, SMS or MMS application with a name highlighted, utilizes the address book application to find a corresponding phone number, and activates the phone application to place a call to the corresponding number, all based simply on the depression of <SEND> key 30. FIGS. 4A and 4B are exemplary views of a portion of display 12 before and after <SEND> key 30 is depressed in use state number 7 of Table 1. As will be appreciated, the selected portion in FIG. 4A (cross hatched) may be another type of contact related information, such as an email address (e.g., jsmith@xyzcompany.com). Also similar is use case number 2 of Table 2, in which a user is on a current telephone call but is, at the same time, utilizing an application other than the phone application, such as the email, browser, SMS or MMS application. In this case, when <END> key 32 is depressed, handheld electronic device 4 activates the phone application to end the call, plays an audible hang-up tone, and momentarily flashes the active call screen with a "disconnected" message. FIGS. 5A and 5B are exemplary views of a portion of display 12 before and after <END> key 32 is depressed in use case 2 of Table 2.

Figure 6:
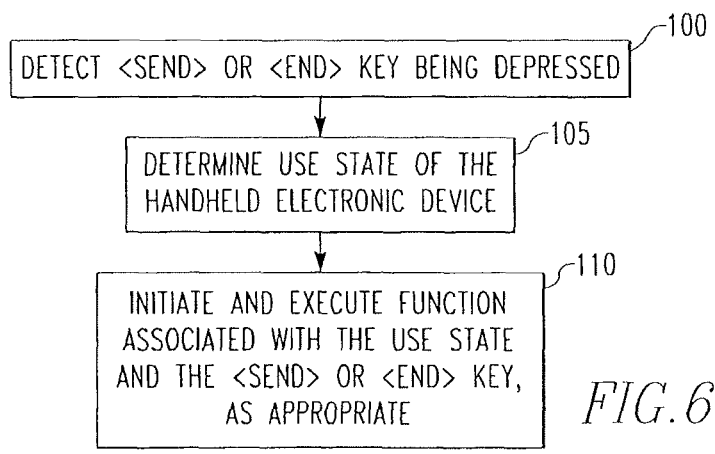
FIG. 6 is a flowchart depicting a routine executed by the processor of the handheld electronic device of FIGS. 1 and 2 for initiating functions based on phone-related inputs according to the invention.

FIG. 6 is a flow chart of a routine for initiating various phone-related functions of handheld electronic device 4 based on phone-related inputs, e.g., inputs from <SEND> key 30 and <END> key 32, according to the invention. As seen in FIG. 6, at 100, <SEND> key 30 or <END> key 32 is depressed by the user and such depression is detected by processor 20. Next, at 105, processor 20 determines the current use state of handheld electronic device 4. Then, at 110, once the current use state is established, processor 20 initiates and executes the function or functions associated with the established use state of handheld electronic device 4 and either <SEND> key 30 or <END> key 32, whichever was depressed at 100. As will be appreciated by those of skill in the art, memory 44 may store a table or the like that associates each use state with the predetermined function or functions that are executed upon depression of <SEND> key 30 or <SEND> key 32 in that use state.

Figure 7:
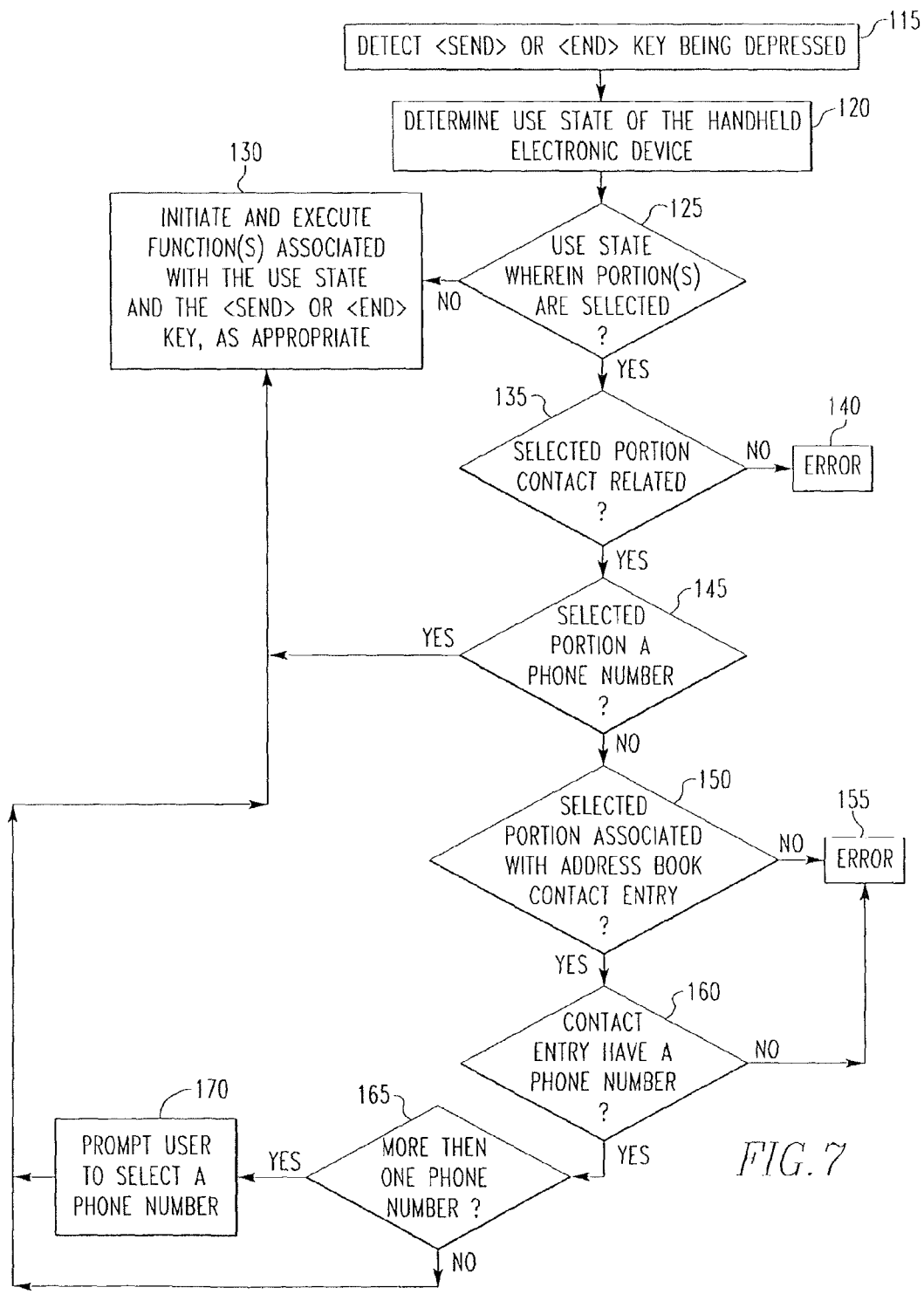
FIG. 7 is a flow chart depicting a particular embodiment of the routine shown in FIG. 6.

FIG. 7 is a flow chart of a particular implementation of the routine shown in FIG. 6 that implements the use states of Tables 1 and 2. In this embodiment, the information in Tables 1 and 2 is stored in memory 44. At 115, <SEND> key 30 or <END> key 32 is depressed and such depression is detected by processor 20. Next, at 120, processor 20 determines the current use state of handheld electronic device 4. At 125, a determination is made as to whether the established use state is a use state wherein one or more portions of information displayed on display 12 are selected by the user using input apparatus 16. If the answer is no, then at 130, processor 20 initiates and executes the function or functions associated with the established use state and either <SEND> key 30 or <END> key 32, whichever was depressed. If the answer at 125 is yes, a determination is made at 135 as to whether the selected portion of information is contact related, meaning it is a phone number, an email address, a name or other contact related information appearing in, for example, a header of an email, SMS or MMS message or a portion of another application, that may also be stored by the address book application of handheld electronic device 4. If the answer at 135 is no, then, as shown at 140, an error state is determined because the selected information cannot be utilized to place a phone call or obtain information required to place a phone call according to the invention. If, however, the answer at 135 is yes, another determination is made at 145 as to whether the selected portion of information is a telephone number or telephone number hyperlink. If it is, then the routine proceeds to 130, where the phone application of handheld electronic device 4 is activated and places a phone call to the telephone number. If the selected portion of information is not a telephone number, but rather is some other type of contact related information, then at 150, a determination is made as to whether the selected portion of information is associated with a contact entry stored by the address book application of handheld electronic device 4. If not, then, at 155, an error condition is detected and the user is preferably notified that a phone call cannot be placed based on the selected information. Otherwise, at 160, a determination is made as to whether the contact entry associated with the selected portion of information includes at least one telephone number. If not, then the routine proceeds to 155. If there is at least one telephone umber, then, at 165, a determination is made as to whether there is more than one telephone number for the contact entry. If there is more than one telephone number, then, at 170, the user is prompted to select one of the numbers after which the routine proceeds to 130, where the phone application of handheld electronic device 4 is activated and places a phone call to the selected telephone number. If at 165 the answer is no, then the routine simply proceeds to 130 and the phone application of handheld electronic device 4 is activated and places a call to the telephone number.

Thus, the invention provides a handheld electronic device capable of executing multiple applications that delivers added convenience for the user by enabling the user to quickly and easily initiate telephone related functions, such as placing a telephone call, directly from applications other than the device's phone and address book applications using a dedicated phone related key.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method implemented by a processor of a mobile electronic device, having an address book application and a phone application, the method comprising: displaying an information portion in another application, the other application being an application other than the phone application and the address book application; determining a pressing of a call-initiation key that is presented independently of a display of the information portion at a time when the information portion is selected by a user, the call-initiation key having a common fixed location relative to a display presented by multiple applications; determining, responsive to determining the pressing of the call-initiation key, without opening or displaying the address book application, but by accessing contact information stored within the address book application, that the information portion does not include a telephone number but includes information associated with a contact entry stored by the address book application; and determining, responsive to determining that the information portion does not include a telephone number but includes information associated with the contact entry, that the associated contact entry includes a plurality of telephone numbers; based on determining the associated contact entry includes a plurality of telephone numbers, prompting a user to select one telephone number of the plurality of telephone numbers; and placing a call to the selected one telephone number; wherein pressing of the call-initiation key activates the phone application to place a call to the telephone number while the other application is still active and in use, and the call-initiation key has another defined function for the other application, a function that is not activating the phone application to place a call.

2. The method of claim 1, wherein the information portion comprises a contact name.

3. The method of claim 1, wherein the call-initiation key is a <SEND> key.

4. The method of claim 1, wherein the other application comprises one of a messaging application, a browser application, a memo application, a calendar application, and a task application.

5. The method of claim 1, further comprising:
determining an error state if the associated contact entry stored by the address book application does not include a telephone number.

6. The method of claim 1, further comprising:
providing a notification indicating that a telephone call cannot be placed when the associated contact entry stored by the address book application does not include a telephone number.

7. A non-transitory computer-readable medium having computer-readable instructions stored thereon for execution by a processor of a mobile electronic device having an address book application and a phone application, wherein the instructions, when executed by the processor, implement a method comprising: displaying an information portion in an other application, the other application being an application other than the phone application and the address book application; determining a pressing of a call-initiation key that is presented independently of a display of the information portion at a time when the information portion is selected by a user, the call-initiation key having a common fixed location relative to a display presented by multiple applications; and determining, responsive to determining the pressing of the call-initiation key, without opening or displaying the address book application, but by accessing contact information stored within the address book application, that the information portion does not include a telephone number but includes information associated with a contact entry stored by the address book application; and determining, responsive to determining that the information portion does not include a telephone number but includes information associated with the contact entry, that the associated contact entry includes a plurality of telephone numbers: based on determining the associated contact entry includes a plurality of telephone numbers, prompting a user to select one telephone number of the plurality of telephone numbers; and placing a call to the selected one telephone number; wherein pressing of the call-initiation key activates the phone application to place a call to the telephone number while the other application is still active and in use, and the call-initiation key has another defined function for the other application, a function that is not activating the phone application to place a call.

8. A mobile electronic device, comprising: a memory having stored thereon an address book application, a phone application, and another application, the other application being an application other than the phone application and the address book application; a display configured to display an information portion when the other application is active; an input apparatus including a call-initiation key that is presented independently of a display of the information portion and that has a common fixed location relative to a display presented by multiple applications; a processor configured to: execute the applications stored on the memory, detect pressing of the call-initiation key at a time when the information portion is selected, and if so, determine, responsive to a detection of the pressing of the call-initiation key, without opening or displaying the address book application, but by accessing contact information stored within the address book application, that the information portion does not include a telephone number but includes information associated with a contact entry stored by the address book application; and determine, responsive to determining that the information portion does not include a telephone number but includes information associated with the contact entry, that the associated contact entry includes a plurality of telephone numbers; based on determining the associated contact entry includes a plurality of telephone numbers, prompting a user to select one telephone number of the plurality of telephone numbers; and place a call to the selected one telephone number; wherein pressing of the call-initiation key activates the phone application to place a call to the telephone number while the other application is still active and in use, and the call-initiation key has another defined function for the other application, a function that is not activating the phone application to place a call.

9. The mobile device of claim 8, wherein the call-initiation key comprises a <SEND> key.

10. The mobile device of claim 8, wherein the input apparatus comprises a keyboard separate from the display, and the call-initiation key is a <SEND> key on the keyboard.

11. The mobile device of claim 8, further comprising means for performing data communication and voice communication.

12. The mobile device of claim 8, wherein the other application comprises one of a messaging application, a browser application, a memo application, a calendar application, and a task application.

13. The method of claim 4, wherein the messaging application comprises one of an email, SMS, and MMS application, and wherein the email address appears in the body of an email, SMS message, or MMS message.

14. The method of claim 1, wherein the call-initiation key is a key that is also selectable outside the other application.

15. The method of claim 1, wherein the call-initiation key is a key that is selectable in each of the address book application, the phone application, and the other application.

16. The method of claim 1, further comprising:
associating at least one respective function with each use state within a plurality of use states for a device displaying the information,
wherein each respective use state is defined based on a respective currently active application and respective currently selected information within the respective currently active application, and
wherein a currently active use state is a use state defined by the currently active application being the other application and the selected information comprising the information portion selected by the user is associated with a function comprising:
the determining the associated contact entry; and
the placing the call.

17. The method of claim 16, further comprising:
determining the selected information comprises contact information, and
wherein the currently active use state is a use state defined by the currently active application being the other application and the selected information comprising contact information is associated with a function comprising:
determining, via the address book application, a respective telephone number associated with the contact information; and
placing a call to the respective telephone number.

18. The method of claim 17, wherein the contact information comprises at least one of a name and an e-mail address.

19. The method of claim 17, wherein the currently active use state is defined by the currently active application being one of an e-mail client, an SMS application, or an MMS application.

20. The method of claim 17, wherein the currently active use state is defined by the currently active application being one of a calendar application or a task application.

* * * * *